(12) United States Patent
Muramatsu et al.

(10) Patent No.: US 7,275,361 B2
(45) Date of Patent: Oct. 2, 2007

(54) CONTROL SYSTEM FOR GAS TURBINE ENGINES

(75) Inventors: Hironori Muramatsu, Wako (JP); Yukinobu Sugitani, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 252 days.

(21) Appl. No.: 11/185,884

(22) Filed: Jul. 21, 2005

(65) Prior Publication Data
US 2007/0089499 A1   Apr. 26, 2007

(30) Foreign Application Priority Data
Jul. 27, 2004   (JP)   ............................. 2004-218221

(51) Int. Cl.
*F02C 9/00*   (2006.01)
(52) U.S. Cl. ..................... 60/39.281; 60/803
(58) Field of Classification Search ............... 60/39.24, 60/39.27, 39.281, 794, 803
See application file for complete search history.

(56) References Cited
U.S. PATENT DOCUMENTS 4,212,161 A * 7/1980 Newirth et al. .......... 60/39.281
4,228,650 A * 10/1980 Camp ....................... 60/39.281
4,307,451 A * 12/1981 Zagranski et al. ........ 60/39.281
5,775,089 A * 7/1998 Skarvan .................... 60/39.281

FOREIGN PATENT DOCUMENTS
JP   2003-184578   7/2003

* cited by examiner

*Primary Examiner*—L. J. Casaregola
(74) *Attorney, Agent, or Firm*—Squire, Sanders & Dempsey L.L.P.

(57) ABSTRACT

In a control system for a gas turbine engine that uses the outlet pressure of the turbine as an importation control parameter, when the high pressure sensor for detecting the outlet pressure of the turbine is found to be faulty, it is determined if an estimated value of the outlet pressure of the compressor is normal or not, and substitute the output value of the high pressure sensor with the estimated value if the estimated value is normal and with the inlet pressure of the fan or a value proportional thereto if the estimated value is not normal. Thereby, the control system is given with such a substitute value for the output of the high pressure sensor in case of a failure of the high pressure sensor that would prevent any abrupt changes in the behavior of the engine and allow the engine to be operated in a stable manner.

6 Claims, 4 Drawing Sheets

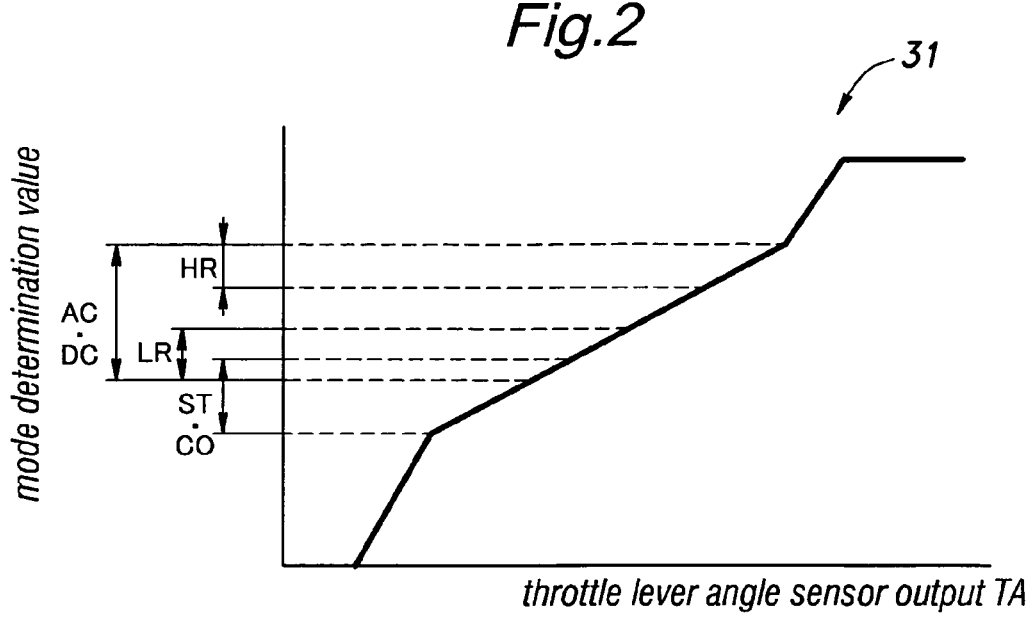
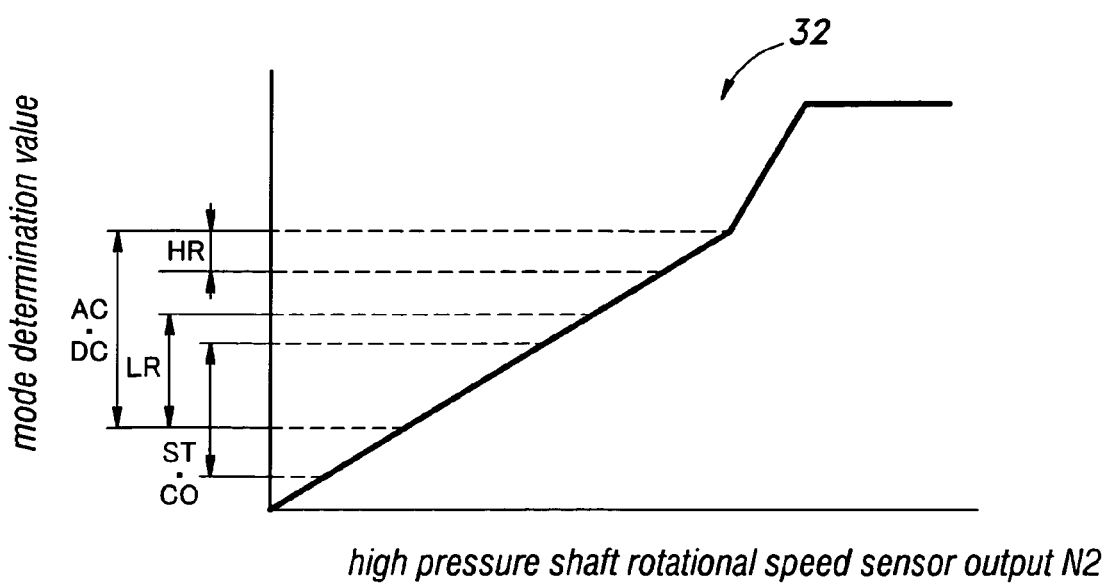

CONTROL SYSTEM FOR GAS TURBINE ENGINES

TECHNICAL FIELD

The present invention relates to a control system for gas turbine engines that allows the gas turbine engine to operate in an acceptable manner even when a pressure sensor for detecting the outlet pressure of the compressor has become faulty.

BACKGROUND OF THE INVENTION

An aircraft gas turbine engine typically employs a number of sensors for the purpose of optimally controlling the engine according to the various state variables detected by the sensors, and the outlet pressure (P3) of the compressor is one of the important control parameters or state variables, particularly in conducting a fuel control using Qfr (fuel flow rate)/P3 (compressor outlet pressure) as a parameter at the time of accelerating or decelerating the engine. By using this parameter, it becomes possible to maintain a favorable air/fuel ratio and avoid misfires. For this reason, it is highly important to obtain a correct value of the compressor outlet pressure P3 at all times.

Should a sensor such as a compressor outlet pressure sensor fail, the resulting abnormal control parameter value would prevent a satisfactory operation of the engine. Therefore, it is highly essential to prepare a countermeasure for the time of a sensor failure.

One known precautionary measure is to use a plurality of sensors for a single control parameter, and detect any fault by comparing the output values of the different sensors. However, on account of the structure of the engine and manufacturing cost, it is difficult to provide a plurality of sensors for monitoring the outlet pressure of the compressor.

Because of such a restriction, it has been previously proposed to filter the output signal when the sensor for the compressor outlet pressure indicates an abnormal output value and to substitute the abnormal sensor output value with a fixed value. It is also known to switch to a non-load operating mode when the sensor output is detected to be abnormal. See Japanese patent laid open publication No. 2003-184578.

However, these known measures are known to have some problems. For instance, depending on the operating condition of the engine, the difference between the substitute value and actual value may be so great that an excessive time may be required for the engine to decelerate, and much depends on the discretion of the engine operator in operating the engine in a stable manner. Also, the control process disclosed in the mentioned patent publication is effective for use in a stationary engine, but is practically unusable for an aircraft engine.

BRIEF SUMMARY OF THE INVENTION

In view of such problems of the prior art, a primary object of the present invention is to provide a control system for gas turbine engines that allows the gas turbine engine to operate in a stable manner even when a pressure sensor for detecting the outlet pressure of the compressor has become faulty.

A second object of the present invention is to provide a control system that can control the engine into a stable state in a relatively short time even when a pressure sensor for detecting the outlet pressure of the compressor has become faulty.

According to the present invention, at least some of these objects can be accomplished by providing a control system for a gas turbine engine, comprising: a high pressure sensor for detecting an outlet pressure of a compressor of the engine; a low pressure sensor for detecting an inlet pressure of a fan of the engine; a high pressure sensor output determining unit for determining if an output value of the high pressure sensor is normal or not; an outlet pressure estimating unit for estimating the outlet pressure of the compressor as a mathematical function of an output value of the low pressure sensor; and an output selection unit for substituting the output value of the outlet pressure estimating unit for the output value of the high pressure sensor when the high pressure sensor output determining unit has determined that the output value of the high pressure sensor is not normal.

Thereby, the control system is given with such a substitute value for the output of the high pressure sensor in case of a failure of the high pressure sensor that would prevent any abrupt changes in the behavior of the engine and allow the engine to be operated in a stable manner.

According to a preferred embodiment of the present invention, when the high pressure sensor output determining unit has determined that the output value of the high pressure sensor is not normal, the output selection unit is adapted to determine if the estimated value of the outlet pressure of the compressor is normal or not, and substitute the output value of the high pressure sensor with the estimated value if the estimated value is normal and with the inlet pressure of the fan detected by the low pressure sensor or a value proportional thereto if the estimated value is not normal.

BRIEF DESCRIPTION OF THE DRAWINGS

Now the present invention is described in the following with reference to the appended drawings, in which:

FIG. 2 is a graph showing the operating mode determining map;

FIG. 3 is a graph showing the other operating mode determining map;

DETAILED DESCRIPTION OF THE PREFERRED EMBODIMENTS

Figure 1:
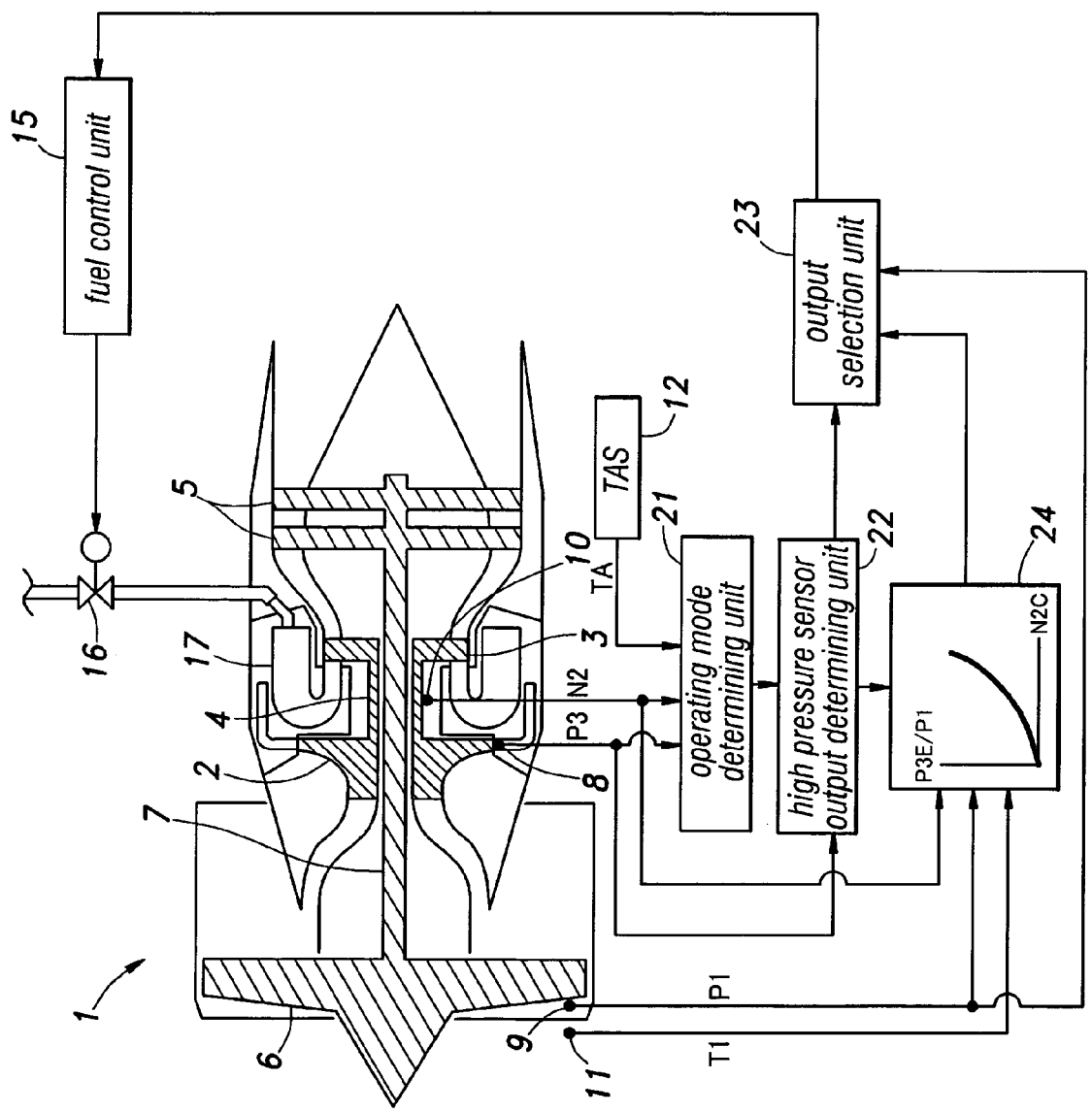
FIG. 1 is a simplified sectional view of a gas turbine engine incorporated with a control system embodying the present invention.

FIG. 1 shows a gas turbine engine incorporated with a control system embodying the present invention. This gas turbine engine 1 comprises a high pressure shaft 4 carrying a compressor wheel 2 and a high pressure turbine wheel 3, and a low pressure shaft 7 carrying a low pressure turbine wheel 5 and a fan 6. The instrumentation of this engine comprises a high pressure sensor 8 for measuring the outlet pressure P3 of the compressor, a low pressure sensor 9 for measuring the inlet pressure P1 of the fan 6, a high pressure shaft rotational speed sensor 10 for measuring the rotational speed N2 of the high pressure shaft 4, an inlet temperature sensor 11 for measuring the inlet temperature T1 of the fan 6 and a throttle lever angle sensor 12 for detecting the angle of a throttle lever (not shown in the drawing). The output signals of these sensors and other sensors not included in FIG. 1 are forwarded to a fuel control unit 15 that controls a fuel metering valve 16 to optimize the amount of fuel supplied to a combustion chamber 17 depending on the state of the engine.

Because the high pressure sensor 8 is placed under a high temperature and high pressure condition during use, it is possible that the sensor becomes faulty. This sensor is highly essential for the proper operation of the engine. Therefore, the control system according to the present invention is provided with an arrangement for taking an appropriate measure in case of a failure in the high pressure sensor 8, and this arrangement includes an operating mode determining unit 21, a high pressure sensor output determining unit 22, an output selection unit 23 and a high pressure value estimating unit 24.

The operating mode determining unit 21 determines the current operating mode of the engine by looking up mode determination value maps 31 and 32 (FIGS. 2 and 3) against the output value N2 of the high pressure shaft rotational sensor 10 and the output value TA of the throttle lever angle sensor 12, respectively. The operating modes of the engine include low load steady state LR, acceleration AC, high load steady state HR, deceleration DC and emergency fuel cut CO. The illustrated embodiment takes into account the output values of the high pressure shaft rotational speed sensor 10 and throttle lever angle sensor 12 for the determination of the engine operating mode, but the precision of mode determination can be increased even further by additionally taking into account a predetermined flight schedule and the output values of a speedometer and an altitude meter.

The high pressure value estimating unit 24 is incorporated with a high pressure value estimation map that gives an estimated outlet pressure of the compressor P3E as a mathematical function of a corrected engine rotational speed N2C, which is given by correcting the output value N2 of the high pressure shaft rotational speed sensor 10 with the input temperature T1 of the fan 6 obtained from the intake temperature sensor 11, and the inlet pressure P1 of the fan 6 obtained from the low pressure sensor 9. This map can be prepared by using a result of a benchmark test. Thus, the estimated high pressure value P3E can be obtained by feeding the inlet temperature T1 and inlet pressure P1 at the inlet of the fan 6 and the high pressure shaft rotational speed N2 to the high pressure value estimation map. The corrected engine rotational speed N2C can be obtained by the following formula:

$$N2C = N2/\{(T1+273)/288\}^{1/2} \quad (1)$$

Figure 4:
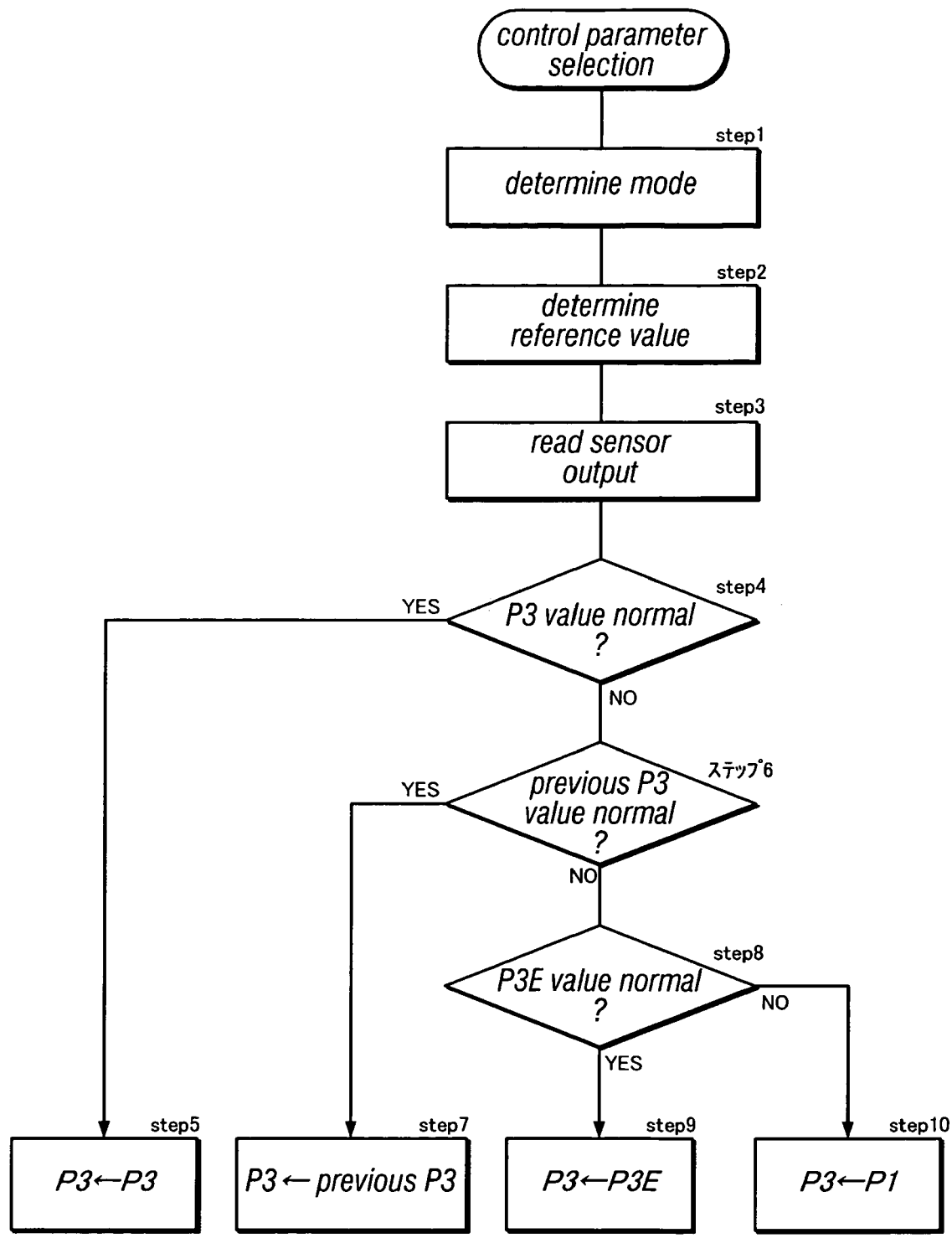
FIG. 4 is a flowchart showing the control flow according to the present invention.

The control flow of the illustrated control system is now described in the following with reference to the flowchart of FIG. 4.

First of all, the operating mode determining unit 21 determines the current operating mode selected from the possible operating modes that include the modes of low load steady state LR, acceleration AC, high load steady state HR, deceleration DC and emergency fuel cut CO (step 1).

Figure 5:
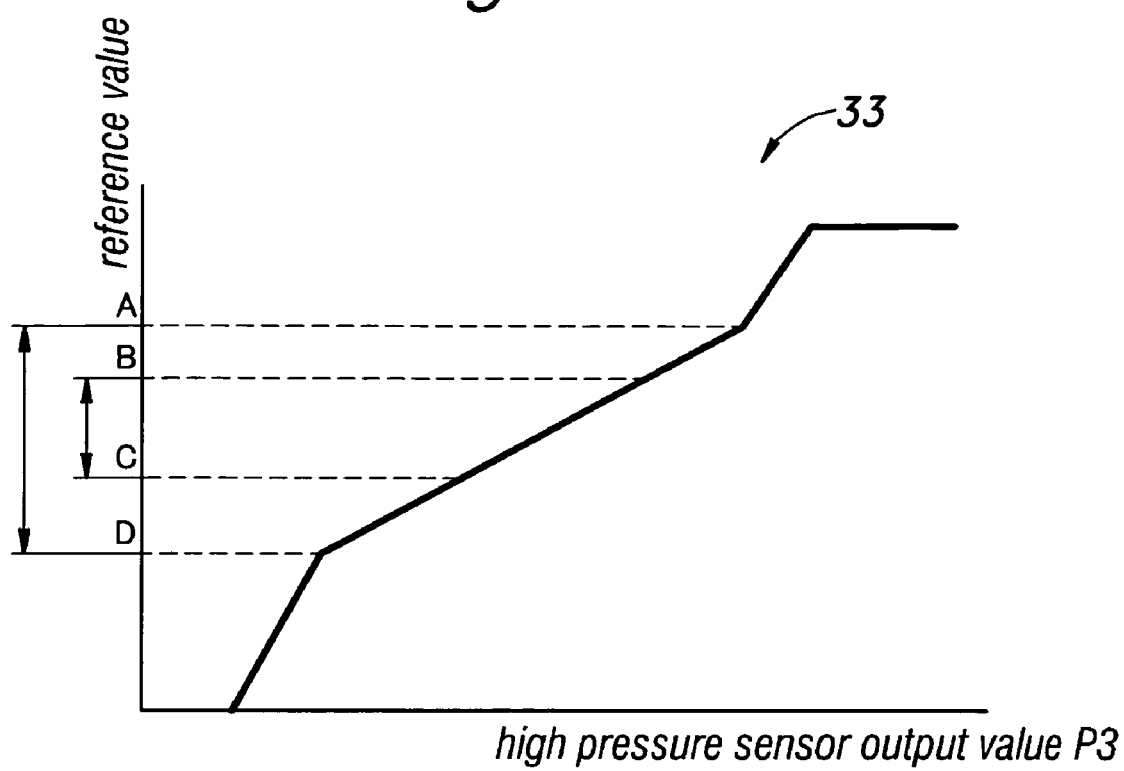
FIG. 5 is a graph showing the reference value map.

Then, a reference value map 33 (FIG. 5) incorporated in the high pressure sensor output determining unit 22 is looked up to determine the reference value ranges that correspond to the current operating mode (step 2). For instance, the reference value range can be given as A-D of FIG. 5 in the start mode ST, and as B-C of FIG. 5 in the low load steady state mode LR.

At the same time, the output value P3 of the high pressure sensor 8 is read (step 3), and is compared with the corresponding reference value by the output pressure sensor output determining unit 22 to determine if the detected value P3 of the high pressure sensor 8 is within the normal range (step 4). More specifically, the output value P3 of the high pressure sensor 8 is sampled at 10 msec, and the high pressure sensor is determined to be faulty if the deviation of the sampled value from the reference exceeds a prescribed threshold value.

If the high pressure sensor 8 is determined to be normal, the output selection unit 23 produces the current output value P3 as the control parameter (step 5). On the other hand, if the high pressure sensor 8 is determined to be abnormal, it is then determined if the high pressure sensor 8 was normal according to the previously sampled output value (step 6). If the sensor was normal according to the previously sampled output value, it is estimated that the abnormal state of the high pressure sensor 8 is temporary, and produces the previously sampled output value P3 for use as the control parameter (step 7). If the sensor was also abnormal according to the previously sampled output value, it is determined that the high pressure sensor 8 is indeed faulty, and it is then determined if the estimated high pressure value P3E obtained by the high pressure value estimating unit 24 is normal or not (step 8).

The estimated high pressure value is determined to be normal or not by evaluating the time histories of the rotational speed N2 of the high pressure shaft 4 and the inlet temperature T1 and inlet pressure P1 of the fan 6, and comparing them with the prescribed threshold values. For instance, in regard to each of the inlet temperature T1 and inlet pressure P1 of the fan 6, the three values obtained from two sensors mounted on the aircraft frame and one more sensor mounted on the engine are compared, and if any two of them produce a same value, this value is regarded as a correct value. In regard to the rotational speed N2 of the high pressure shaft 4, the four values obtained from two sensors mounted on the aircraft body and from two more sensors mounted on the engine are compared, and if any three of them produce a same value, this value is regards as a correct value.

If the estimated high pressure value P3E is determined to be normal, the output selection unit 23 produces the estimated high pressure value P3E for use as the control parameter in controlling the engine (step 9). On the other hand, if the estimated high pressure value P3E is determined to be abnormal, the output selection unit 23 produces the output P1 from the low pressure sensor 9 or a value substantially proportional to the output P1 from the low pressure sensor 9 for use as the control parameter in controlling the engine (step 10).

Because the low pressure sensor 9 typically consists of a plurality of sensors that are mounted on the engine and aircraft frame, and are placed in a relatively favorable environment in either case, a high reliability can be ensured without any difficulty. Also, although the pressure level measured by the low pressure sensor 9 is significantly different from that measured by the high pressure sensor 8, there is a certain proportional relationship between the output values of the low pressure sensor 9 and high pressure sensor 8. Therefore, in case of a failure of a high pressure sensor, a significant advantage can be gained by using an estimated value of the high pressure value based on the output of the low pressure sensor 9 as compared with the use of a predetermined fixed value or a value obtained by modifying the unreliable output value P3 of the high pressure sensor 8.

When the output value P1 of the low pressure sensor 9 is substituted for the output value P3 of the high pressure sensor 8, it is possible to prevent misfire at high altitude where P1 is relatively small and prevent an unacceptable air/fuel ratio on the ground and at low altitude where the different between the two values P1 and P2 is relatively small and the absolute value of P1 is relatively great.

Thus, according to the present invention, in case of a failure in the high pressure sensor 8 for detecting the outlet pressure of the compressor, by using the output value P1 of the low pressure sensor 9 for detecting the inlet pressure of the fan 6, it becomes possible to prevent abrupt changes in the behavior of the engine and to maintain a stable operation of the engine. If the output value P1 of the low pressure sensor 9 is also found to be abnormal, a fixed value such as the atmospheric pressure value (1.003 kgf/cm$^2$) may be used as a substitute value for the control parameter.

Although the present invention has been described in terms of preferred embodiments thereof, it is obvious to a person skilled in the art that various alterations and modifications are possible without departing from the scope of the present invention which is set forth in the appended claims.

The contents of the original Japanese patent application on which the Paris Convention priority claim is made for the present application are incorporated in this application by reference.

The invention claimed is:

1. A control system for a gas turbine engine, comprising:
   a high pressure sensor for detecting an outlet pressure of a compressor of the engine;
   a low pressure sensor for detecting an inlet pressure of a fan of the engine;
   a high pressure sensor output determining unit for determining if an output value of the high pressure sensor is normal or not;
   an outlet pressure estimating unit for estimating the outlet pressure of the compressor as a mathematical function of an output value of the low pressure sensor; and
   an output selection unit for substituting the output value of the outlet pressure estimating unit for the output value of the high pressure sensor when the high pressure sensor output determining unit has determined that the output value of the high pressure sensor is not normal.

2. The control system according to claim 1, wherein the mathematical function gives the estimated value of the outlet pressure of the compressor according to a rotational speed of the engine and an inlet temperature of the fan as well as the inlet pressure of the fan.

3. The control system according to claim 1, wherein the mathematical function gives the estimated value of the outlet pressure as being proportional to the inlet pressure of the fan.

4. The control system according to claim 1, wherein the mathematical function gives the estimated value of the outlet pressure as being identical to the inlet pressure of the fan.

5. The control system according to claim 1, wherein, when the high pressure sensor output determining unit has determined that the output value of the high pressure sensor is not normal, the output selection unit is adapted to determine if the estimated value of the outlet pressure of the compressor is normal or not, and substitute the output value of the high pressure sensor with the estimated value if the estimated value is normal and with the inlet pressure of the fan detected by the low pressure sensor if the estimated value is not normal.

6. The control system according to claim 1, wherein, when the high pressure sensor output determining unit has determined that the output value of the high pressure sensor is not normal, the output selection unit is adapted to determine if the estimated value of the outlet pressure of the compressor is normal or not, and substitute the output value of the high pressure sensor with the estimated value if the estimated value is normal and with a value proportional to the inlet pressure of the fan detected by the low pressure sensor if the estimated value is not normal.

\* \* \* \* \*